United States Patent
Liss et al.

(10) Patent No.: US 10,782,021 B2
(45) Date of Patent: Sep. 22, 2020

(54) ASH SINTERING GASIFIER

(71) Applicants: Barry Liss, Pompano Beach, FL (US); Brandon Ruf Wilson, Bothell, WA (US)

(72) Inventors: Barry Liss, Pompano Beach, FL (US); Brandon Ruf Wilson, Bothell, WA (US)

(*) Notice: Subject to any disclaimer, the term of this patent is extended or adjusted under 35 U.S.C. 154(b) by 186 days.

(21) Appl. No.: 15/586,722

(22) Filed: May 4, 2017

(65) Prior Publication Data
US 2018/0051877 A1    Feb. 22, 2018

Related U.S. Application Data

(60) Provisional application No. 62/494,846, filed on Aug. 22, 2016.

(51) Int. Cl.
*F23G 5/50* (2006.01)
*F23G 5/20* (2006.01)
(Continued)

(52) U.S. Cl.
CPC ........... *F23G 5/50* (2013.01); *F23G 5/027* (2013.01); *F23G 5/0276* (2013.01); *F23G 5/12* (2013.01);
(Continued)

(58) Field of Classification Search
CPC ........................................ F23G 5/50
See application file for complete search history.

(56) References Cited

U.S. PATENT DOCUMENTS 3,519,815 A * 7/1970 Sandbrook ........... G05D 11/137
                                                             436/55
3,595,544 A * 7/1971 Curtis ....................... F27B 7/42
                                                              432/37
(Continued)

FOREIGN PATENT DOCUMENTS

| RU | 81291 U1 | 3/2009 |
| RU | 112195 U1 | 1/2012 |
| WO | 2015/069592 A1 | 5/2015 |

OTHER PUBLICATIONS

International Search Report and the Written Opinion of the International Searching Authority dated Nov. 2, 2017 in PCT Application No. PCT/US2017/046133, international filing date Aug. 9, 2017. (7 Pages).

*Primary Examiner* — Nathaniel Herzfeld
(74) *Attorney, Agent, or Firm* — Ingram IP Law, P.A.

(57) ABSTRACT

A method is provided for thermally converting non-radioactive combustible wastes to a substantially non-hazardous, non-leachable, sintered particulate carbon-less ash by-product in a kiln having a plurality of reaction zones. The kiln including first and second ends and a body provided between the first and second ends that defines a cavity having a refractory lining that provides resistance to heat conduction. A processor and flow rate controllers are provided that control a flow rate through the body of waste that enters at the first end of the kiln and the flow rate of oxidant gas that enters at the second end of the kiln, the second end being opposite to the first end. The body may be positioned substantially horizontal and may include a length-to-diameter ratio and a resistance to heat conduction that provides a temperature gradient within the cavity to forms separate reaction zones during operation.

14 Claims, 5 Drawing Sheets

(51) Int. Cl.
  *F23G 5/027* (2006.01)
  *F23G 5/12* (2006.01)
  *F23G 5/32* (2006.01)
  *F23G 5/44* (2006.01)
  *F23G 5/46* (2006.01)
  *F23N 3/00* (2006.01)

(52) U.S. Cl.
  CPC ............... *F23G 5/20* (2013.01); *F23G 5/32* (2013.01); *F23G 5/444* (2013.01); *F23G 5/46* (2013.01); *F23N 3/002* (2013.01); *F23G 2203/206* (2013.01); *F23G 2203/207* (2013.01); *F23G 2206/10* (2013.01); *F23G 2207/101* (2013.01); *F23G 2900/52002* (2013.01); *Y02E 20/12* (2013.01)

(56) References Cited

U.S. PATENT DOCUMENTS

| | | | | | |
|---|---|---|---|---|---|
| 3,743,697 | A | * | 7/1973 | Jones | C01F 11/06 423/175 |
| 4,318,713 | A | * | 3/1982 | Lee | C10J 3/005 48/203 |
| 4,489,562 | A | * | 12/1984 | Snyder | C10J 3/08 48/197 R |
| 4,591,362 | A | * | 5/1986 | Yudovich | C10J 3/06 201/33 |
| 4,934,931 | A | * | 6/1990 | Angelo, II | F23G 5/027 110/246 |
| 5,476,990 | A | * | 12/1995 | Hittner | A62D 3/32 423/111 |
| 5,553,554 | A | * | 9/1996 | Urich, Jr. | C10J 3/06 110/210 |
| 8,985,472 | B2 | * | 3/2015 | Peterman | F27D 19/00 236/10 |
| 2005/0051066 | A1 | * | 3/2005 | May | F23G 5/006 110/345 |
| 2009/0000301 | A1 | * | 1/2009 | Graham | C10J 3/24 60/645 |
| 2014/0202079 | A1 | * | 7/2014 | Rehmat | C10J 3/005 48/89 |

* cited by examiner

ASH SINTERING GASIFIER

CROSS-REFERENCE TO RELATED APPLICATIONS

This application claims priority to U.S. Provisional Application 62/494,846, filed on Aug. 22, 2016, the complete disclosure of which is incorporated herein by reference in its entirety.

FIELD OF THE TECHNOLOGY

The present technology relates to reliable production of a fuel gas and a by-product non-hazardous, non-leachable ash, in the thermal processing of solid waste or biomass, and more specifically, to the performance and control of waste gasification kilns that are part of waste re-use processes that produce one or more useful products such as power, steam, heat or hot water, or chemicals, and does so in full compliance with environmental emissions regulations.

BACKGROUND OF THE TECHNOLOGY

A majority of municipal solid waste ("MSW") is collected by trash trucks and transported to landfills where it is dumped into designated areas. When a dumping cell is full, it is sealed with a plastic sheet and covered in several feet of dirt. The buried MSW causes several environmental hazards as it decomposes, including generation of greenhouse gases ("GHG") such as carbon dioxide ($CO_2$) and methane ($CH_4$).

MSW includes everyday items that are discarded by the public. For example, MSW may include biodegradable waste, inert waste, combustible construction and demolition waste, composite waste, certain types of hazardous or toxic waste, biomedical waste, and/or recyclable materials. The composition of MSW may vary greatly from municipality to municipality and may change over time. The MSW may originate from residential, commercial, institutional, and/or industrial sources.

Rather than burying the MSW in landfills, the MSW may be combusted to reduce the GHG equivalent levels below those produced through burying the MSW in landfills. Furthermore, the MSW may be combusted to recover energy from the waste. The conversion of waste-to-energy ("WTE") may be performed at a WTE facility. The MSW may be sorted and shredded to produce refuse derived fuel ("RDF") that is used to fire boilers that produce steam used to generate electrical power. For example, waste incinerator systems are known to generate process steam and/or electrical power while reducing MSW volume and mass. However, conventional incinerator systems often suffer from inadequate emission controls that degrade the atmosphere with hazardous air pollutants including acid gases, volatile organic compounds, and particulate matter, including heavy metals. For example, conventional incinerator systems produce high levels of nitrogen oxides (NOx), as well as oxides of sulfur ($SO_x$) hydrochloric acid, dioxins and furans, fine particulate matter, and toxic metals, among other undesirable by-products.

With respect to NOx formation during combustion, the three primary NOx contributors include (1) fuel NOx, (2) prompt NOx, and (3) thermal NOx. Fuel NOx is formed during combustion when a partially decomposing component specie having a carbon-nitrogen bond is oxidized, either by oxygen or a hydroxyl species. Prompt NOx follows a similar pathway to fuel NOx with a distinction that prompt NOx is typically associated with high energy density fuels such as natural gas, with free radical formation occurring within the fuel rich region of the combustion zone flame. Thermal NOx is formed at very high temperatures associated with the high energy requirement to break a nitrogen-nitrogen triple bond and enable oxidation to a NOx specie. While the reaction rates for each of these three NOx formations are different, all NOx is formed as a function of oxygen concentration and temperature. Furthermore, conventional incinerator systems produce solid residues that require special storage arrangements to prevent un-combusted organics and heavy metal contaminants from leaching into ground water. These and other drawbacks exist with conventional incinerator technology.

DETAILED DESCRIPTION OF THE TECHNOLOGY

Figure 1:
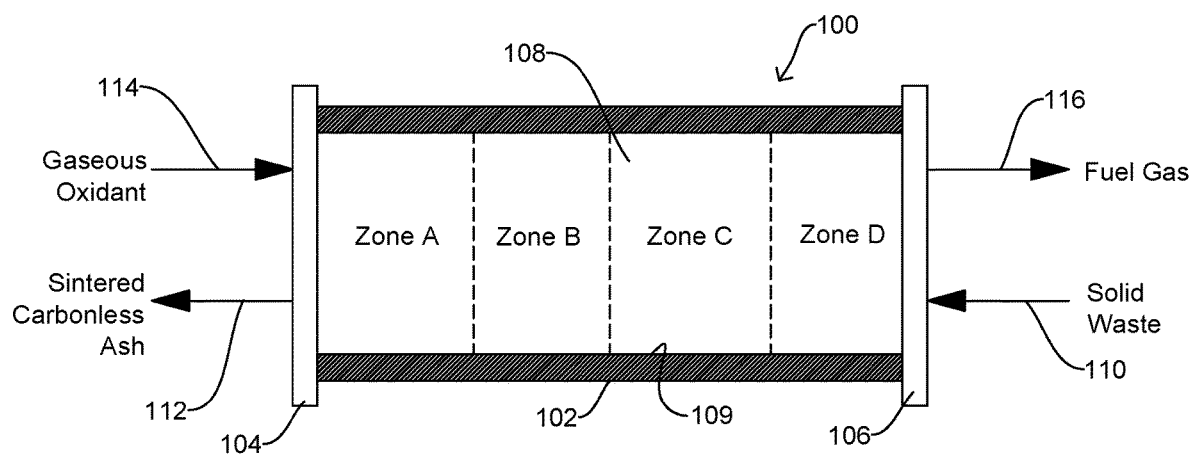
FIG. 1 illustrates a kiln gasifier according to one example of the technology.

It will be appreciated that for simplicity and clarity of illustration, where appropriate, reference numerals may be repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures, and components have not been described in detail so as not to obscure the related relevant feature being described. Also, the description is not to be considered as limiting the scope of the examples described herein. The drawings are not necessarily to scale and the proportions of certain parts may have been exaggerated to better illustrate details and features of the present disclosure. Those skilled in the art with access to the teachings provided herein will recognize additional modifications, applications, and examples within the scope thereof and additional fields in which the technology would be of significant utility.

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and means either, any, several, or all of the listed items. The terms "comprising," "including," and "having" are used interchangeably in this disclosure. The terms "comprising," "including," and "having" mean to include, but are not necessarily limited to the things so described.

The terms "connected" and "coupled" are not restricted to physical or mechanical connections or couplings, and can include electrical connections or couplings, whether direct or indirect. The connection can be such that the objects are permanently connected or releasably connected. The term "communicatively coupled" is defined as connected, either directly or indirectly through intervening components, and the connections are not necessarily limited to physical connections, but are connections that accommodate the transfer of data, signals, or other matter between the so-described components. The term "substantially" is defined to be essentially conforming to the thing that it "substantially" modifies, such that the thing need not be exact. For example, substantially real-time means the occurrence may happen without noticeable delay, but may include a slight delay.

The terms "circuit," "circuitry," and "controller" may include either a single component or a plurality of components, which are either active and/or passive components and may be optionally connected or otherwise coupled together to provide the described function. The "processor" described in any of the various examples includes an electronic circuit that can make determinations based upon inputs and is interchangeable with the term "controller." The processor can include a microprocessor, a microcontroller, and a central processing unit, among others, of a general purpose computer, special purpose computer, ASIC, or other programmable data processing apparatus. While a single processor can be used, the present disclosure can be implemented over a plurality of processors.

The "server" described in any of the various examples includes hardware and/or software that provides processing, database, and communication facilities. By way of example, and not limitation, "server" may refer to a single, physical processor with associated communications and data storage and database facilities, or it can refer to a networked or clustered complex of processors and associated network and storage devices, as well as operating software and one or more database systems and application software that support the services provided by the server.

For the purposes of this disclosure, a computer readable medium stores computer data in machine readable form. By way of example, and not limitation, the computer readable medium may include computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium that may be used to store the desired information and which can be accessed by the computer.

It is understood that each block of the block diagrams or operational illustrations, and combinations of blocks in the block diagrams or operational illustrations, can be implemented with analog or digital hardware and computer program instructions. The computer program instructions may be provided to a processor that executes the computer program instructions to implement the functions/acts specified in the block diagrams or operational block or blocks. In some alternative implementations, the functions/acts noted in the blocks may occur out of the order noted in the operational illustrations. For example, two blocks shown in succession may, in fact, be executed substantially concurrently or the blocks may sometimes be executed in the reverse order, depending upon the functionality/acts involved.

The product that exits an air fed gasification device will be referred to throughout this disclosure as "fuel gas." Fuel gas may contain hydrocarbons; sulfur containing gases such as hydrogen sulfide and other gases; nitrogen containing gaseous species such as ammonia and other gases; halide containing gaseous species such as hydrochloric acid and other gases; and particulates. The particulates are commonly known as fly-ash when exiting the gasifier or kiln with gaseous products. Alternatively, the particulates are commonly known as bottom ash when exiting the gasifier in a solid or molten stream. If the gasifier is air fed, as opposed to oxygen blown, then a major component of the fuel gas that exits the gasifier will include di-molecular nitrogen. The combustible gas that exits a gasifier will be referred to as fuel gas throughout this disclosure.

According to one example, the technology described herein includes a rotating kiln that receives and gasifies waste material to form a fuel gas and a consolidated, inert ash. For example, the kiln may receive waste material such as municipal solid waste, refuse derived fuel, tire derived fuel, construction and demolition waste, medical, and/or hazardous waste. According to one example, the rotating kiln may receive a mixture of waste materials or fuels. According to one example, the kiln may receive a char and ash residue from a gasifier. According to one example, the kiln may be fed by a mixture of waste derived fuels and char and ash residue from a primary gasifier. According to one example, a primary gasifier may be provided upstream of the kiln. According to one example, temperatures throughout the kiln may be controlled to react all of the carbon in the fuel. According to one example, temperatures throughout the kiln may be controlled to raise a temperature of any remaining ash to a softened or sintering temperature, thereby forming a consolidated, inert product.

As materials are heated to a temperature near, but below, their melting point, a process occurs called "sintering." Sintering includes a series of physical processes that result in the particles of the materials connecting and forming larger particles, clumps, or bodies. The sintering process causes the materials to undergo physical changes such as having a reduced volume, a reduced surface area, or an increased particle size, among other physical changes. "Consolidation" of ash is another term that is substantially similar to sintering in the context of this disclosure. In contrast, as materials are heated to a temperature at or above their melting point, a process occurs called "slagging." Slagging includes a series of physical processes that result in melting or liquefying of all or a majority of particles in the materials. "Fusing" is another term that is substantially similar to slagging in the context of this disclosure.

According to one example, kiln performance may be controlled by a combination of design geometry, regulation of oxidant composition, rotation rate, and feed rate. According to one example, the oxidant feed rate may be established in proportion to a per unit mass of moisture and ash free waste fed; per unit moisture content; and per unit inorganic ash forming species. According to one example, a peak solids temperature in the kiln may be set below the ash fusion point, but above a temperature range where steam, fixed carbon or coke reactions, and the carbon dioxide fixed carbon or coke reactions, are kinetically limited. According to one example, the technology transfers sufficient enthalpy from the combustion and gasification zones, via radiation, conduction, and convection to sustain drying of the moisture and devolatilization of the volatile matter in the waste feed.

FIG. 1 illustrates a kiln gasifier 100 according to one example of the technology. According to one example, the kiln gasifier 100 may include a body 102 that together with ends 104,106 define a cavity 108. According to one example, the kiln gasifier 100 may include a first inlet port 110 that deposits solid waste into the cavity 108 and a first outlet port 112 that expels sintered carbonless ash from the cavity 108. According to one example, the kiln gasifier 100 may include a second inlet port 114 that receives gaseous oxidant in the cavity 108 and a second outlet port 116 that expels fuel gas from the cavity 108.

According to one example, the kiln gasifier 100 may include a nearly horizontal, refractory lined kiln that receives predominantly solid waste at one end and an oxidant gas or a blend of oxidant gases at an opposite end such that the gases and solids flow and are contacted counter-currently to each other. According to one example, the oxidant gas may include a composition of ambient air or may include a higher percentage of oxygen. According to one example, the kiln gasifier 100 may include a sufficient length-to-diameter ratio to enable desired processes within the kiln gasifier 100. For example, the length-to-diameter ratio (L/D) of the kiln gasifier 100 may include a size that is greater than 4/1, but less than from 10/1 to 20/1. According to one example, a L/D greater than 20/1 may be required in cement applications that utilize the energy content of the solid waste. According to one example, the kiln gasifier 100 may include refractory characteristics that provide sufficient resistance to heat conduction to sustain sufficient temperature gradients that enable formation of multiple predominant zones within the kiln gasifier 100. According to one example, the multiple predominant zones may be controlled to exhibit distinct physical and chemical processes.

According to one example, a motor may be mechanically coupled to the kiln gasifier 100 in order to rotate or spin the body 102 during operation such as around a lengthwise axis. According to one example, the rotating body 102 may be sufficiently tilted such that a combination of centrifugal force due to rotation and the force of gravity convey the solid waste during operation from the first inlet port 110 toward the first outlet port 112. For example, the body 102 may be tilted in a range of 1°-5° such that the portion of the lower surface 109 that contacts the end 104 is below the portion of the lower surface 109 that contacts the end 106. According to one example, the body 102 may be tilted such that the lower surface 109 located adjacent to the end 104 is lower relative to the lower surface 109 located adjacent to the end 106. According to one example, the body 102 may be formed of a cylindrical shape. However, one of ordinary skill in the art will readily appreciate that the body 102 may be formed of other shapes. Additionally, one of ordinary skill in the art will readily appreciate that other devices may be employed to convey the solid waste along the body 102 during operation. For example, the other devices may include a conveyor belt or the like.

FIG. 1 illustrates the kiln gasifier 100 with different thermo-chemical reaction zones A-D. According to one example, each of the thermo-chemical reaction zones A-D depicts an area within the kiln gasifier 100 having characteristics that are particular for a given chemical action and heat value. According to one example, the approximate boundaries between adjacent zones A-D may be identified during operation of the kiln gasifier 100. For example, the boundaries may be established based on operating conditions of the kiln gasifier 100 that are determined by a composition of the deposited solid waste, a rate at which the solid waste is deposited, an amount of solid waste deposited, a rate at which the gaseous oxidant is deposited, a volume of gaseous oxidant deposited, the tilt angle of the body 102, and a spin rate of the body 102, among other operating conditions.

According to one example, the kiln gasifier 100 is depicted with four predominant zones that sequentially follow a feed direction of the oxidant gas. According to one example, the oxidant gas or gases are heated against the sintered particulate ash in zone A before the ash exits the kiln gasifier 100. According to one example, the oxidant gas or gases burn any residual fixed carbon or coke from the sintered particulate ash to produce a hot flue gas and a carbonless solid product in zone B. According to one example, water gas is produced in zone C by an endothermic gasification of the fixed carbon or coke burned from the sintering particulate ash. In zone C, water gas may be generated by gasification of the residual carbon or coke. Furthermore, water gas may be generated from carbon dioxide or water present in the oxidant feed or in a separate stream injected into the kiln gasifier 100 for purposes of reaction control or the like. According to one example, incoming solid waste is dried and devolatilized in zone D to produce a fuel gas that is a blended gaseous product that may include water gas and hydrocarbon gases. According to one example, the hydrocarbon gases may range from light hydrocarbon gases to tars. According to one example, the solids in zone D are heated to a temperature above which the volatile matter volatizes quickly, as compared to a total solids residence time in the kiln gasifier 100.

According to one example, the boundary lines between adjacent zones A-D may vary or shift during operation of the kiln gasifier 100. For example, the boundary lines between adjacent zones A-D may shift due to changing operating conditions of the kiln gasifier 100 such as changes in a composition of the deposited solid waste, changes in a rate at which the solid waste is deposited, changes in an amount of solid waste deposited, changes in a rate at which the gaseous oxidant is deposited, changes in a volume of gaseous oxidant deposited, changes in the tilt angle of the body 102, and changes in the spin rate of the body 102, among other changes in operating conditions. For example, one or more of zones A-D may increase in size or decrease in size along the axial direction of the kiln gasifier 100. Furthermore, one of ordinary skill in the art will readily appreciate that the kiln gasifier may include more than four zones or less than four zones.

Figure 2A:
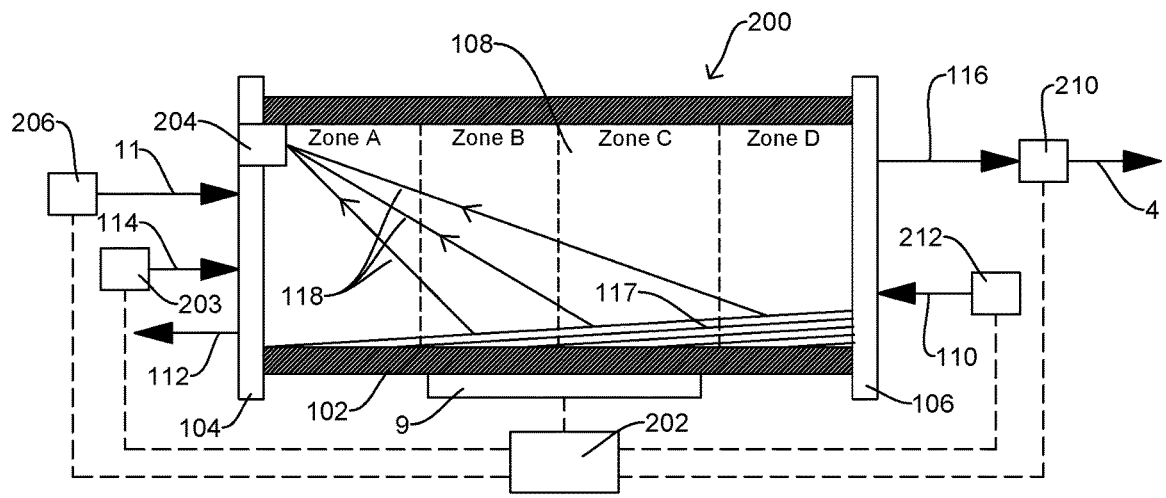
FIG. 2A is a kiln gasifier with various system components for monitoring and controlling thermo-chemical reaction zones according to one example of the technology.

FIG. 2A illustrates a kiln gasifier 200 with system components according to one example of the technology. According to one example, the system components may include a processor 202, various sensors, flow controllers, or the like. According to one example, the kiln gasifier 200 may include system components that monitor characteristics within the thermo-chemical reaction zones A-D and control operating conditions within the kiln gasifier 200 to obtain desired characteristics within the thermo-chemical reaction zones A-D. According to one example, the kiln gasifier 200 may include a thermal sensor 204 that measures a surface temperature of particles provided along the lower surface 109 of the kiln gasifier 200. According to one example, the processor 202 may generate a surface temperature profile based on the surface temperature values of particles provided along the lower surface 109 of the kiln gasifier 200. According to one example, the thermal sensor 204 may include an infrared thermal sensor or the like. According to one example, the processor 202 may receive signals from the thermal sensor 204 and may send signals to flow rate controllers 203-212 that are provided at corresponding inlet or outlet ports 110,112,114,116 in order to regulate or control operating conditions within the kiln gasifier 200. For example, the processor 202 may control the flow rate controllers 206, 212 to regulate feed rates into the kiln gasifier 200 such as a solids feed rate and an oxidant feed rate, among other feed rates.

According to one example, the processor 202 may communicate with the thermal sensor 204 to monitor an axial temperature profile within the kiln gasifier 200. For example, the processor 202 may communicate with the thermal sensor 204 to measure a surface temperature of the particulates in order to detect an onset of particulate sintering. According to one example, the processor 202 may communicate with the flow rate controllers 203-212 to adjust flow rates into the kiln gasifier 200 in order to control the axial temperature profile. For example, the processor 202 may employ the flow rate controllers 203-212 to regulate a proportion of oxidant-to-waste ratio that is fed into the kiln gasifier 200. According to another example, the processor 202 may control the flow rate controllers 203-212 to change a ratio of water or carbon dioxide delivered into the kiln gasifier 200 relative to the waste feed rate. According to one example, the temperature profile of the kiln gasifier 200 may be sustained in a range of temperatures that enable the intended physical and chemical processes to occur in each of zones A-D.

According to one example, the processor 202 may communicate with the flow rate controllers 203-212 to control or regulate fuel proportions within the kiln gasifier 200 such as proportions of solid waste or biomass relative to oxidants such as air, enriched air, or oxygen, among other oxidants. Furthermore, the processor 202 may communicate with the flow rate controllers 203-212 to regulate reagent proportions within the kiln gasifier 200 such as a proportion of steam or recycled flue gas, among other reagents. According to one example, the recycled flue gas may include nitrogen, oxygen, water vapor, or carbon dioxide, among others. Still further, the processor 202 may adjust the flow rate controllers 203-212 to regulate diluent proportions within the kiln gasifier 200 such as a proportion of nitrogen, among other diluents. Additionally, the processor 202 may control the flow rate controllers 203-212 to modify an extent of carbon conversion by controlling an amount of oxygen available within the kiln gasifier 200. Still further, the processor 202 may communicate with the motor 9 to adjust a kiln rotation rate, among controlling other operating conditions.

During operation of the kiln gasifier 200, solid waste and residue are deposited into the body 102 through the first inlet port 110. According to one example, the solid waste and residue move through the thermo-chemical reaction zones A-D in a reverse flow direction compared to the flow direction of the gaseous oxidant entering from the second inlet port 114. According to one example, the solid waste and residue are transformed into a sintered carbonless ash while moving through the thermo-chemical reaction zones A-D in the reverse flow direction. According to one example, the sintered carbonless ash is extracted from the kiln gasifier 200 at the first outlet port 112.

According to one example, the solid waste and residue are initially deposited into the kiln gasifier 200 at zone D and pass sequentially through zones C and B before exiting the kiln gasifier 200 at zone A in the form of a sintered carbonless ash. According to one example, as the solid waste and residue pass through zones A-D, the solid waste and residue are sequentially dried, devolatilized, gasified, combusted, and cooled to a temperature that is below the sintering temperature of the solid waste and residue. As discussed above, zones A-D represent regions within the kiln gasifier 200 having different physical characteristics and chemical processes. For example, the solid waste and residue are exposed to different temperatures within zones A-D. Furthermore, the solid waste and residue have different physical characteristics within each zone A-D, including a different depth of the solid waste particles and a different size of the solid waste particle, among other physical characteristics.

According to one example, the second inlet port 114 delivers an oxidant stream or a recycled flue gas stream into zone A of the kiln gasifier 200 in order to preheat the oxidant stream or the recycled flue gas before the solid product is removed through the first outlet port 112, for example. According to one example, the oxidant stream or the recycled flue gas stream may be preheated when the solid product is cooled from a sintering temperature range in zone A prior to withdrawal through the first outlet port 112. According to one example, the solid product may be cooled in the presence of the oxidant gases as the solid product is being withdrawn by an ash cooler conveyor system. According to one example, the oxidant stream introduced into zone A may receive heat that is generated within the kiln gasifier 200 such that no supplemental heat, which is generated external to the kiln gasifier 200, is needed. According to one example, the oxidant stream may include air, oxygen enriched air, recycled flue gas, steam, carbon dioxide, or any combination of these species.

According to one example, the oxidant stream flows into zone B and consumes any product char that remains in the ash residue. According to one example, the oxidant stream in zone B may include steam or carbon dioxide that heats any solids therein to an optimal temperature range that substantially and instantaneously consumes any carbon residue provided in the counter flowing char-ash residue via gasification. Accordingly, gasification reactions may occur in zone B within a sintering temperature range of the solid inorganic species, but below a range of complete ash melting. In this way, the gasification reaction may be limited by mass transfer rather than thermo-kinetics.

According to one example, as the oxidative gases provided in zone B reach the remaining ungasified carbon, the initial combustion creates a region within zone B that achieves a peak temperature that assures sintering to an inert ash. According to one example, the rapid gasification is endothermic and causes zone B to begin cooling. According to one example, the reaction becomes kinetically limited at a transition between zones B and C. For example, the reaction becomes kinetically limited as the gases enter zone C. According to one example, the reaction between the oxidant streams and the counter flowing solid product creates a fuel gas having a primary component known as water gas. According to one example, water gas may include carbon monoxide, carbon dioxide, hydrogen, and water. According to one example, the fuel gas also may include nitrogen, trace amounts of noble gases, and light hydrocarbon gases if the kiln gasifier 200 is air fed. According to one example, energy may be transferred from zone B primarily by radiation. Additionally, energy may be transferred from zone B by bulk transport and by conduction along and through the refractory of the body 102.

According to one example, the fuel gas stream that exits from zone B may be gradually cooled in zone C by an endothermic gasification reaction of the counter flowing char-ash residue that occurs in zone D. According to one example, the endothermic gasification reaction may occur in a thermo-kinetically limited manner. According to one example, the fuel gas stream that exits from zone B may be further cooled in zone C due to heating of the counter flowing solids to a temperate that is close to, but below, the ash sintering temperature range.

According to one example, the fuel gas stream may expel heat in zone D such that the solid waste or biomass introduced through the first inlet port 110 is first dried by the heat and subsequently devolatilized in a volatile matter to produce a char residue product that is transported into zone C. According to one example, the fuel gas that exits the second outlet port 116 may include predominantly water gas and a blend of light and heavy hydrocarbons having a small amount of entrained particulates that amount to less than 1 percentage weight (wt %) of gas. According to one example, the kiln gasifier 200 may be operated such that substantially all of the heating value of waste fuel is transferred to the fuel gas and a negligible amount enthalpy escapes in the ash product stream.

Figure 2B:
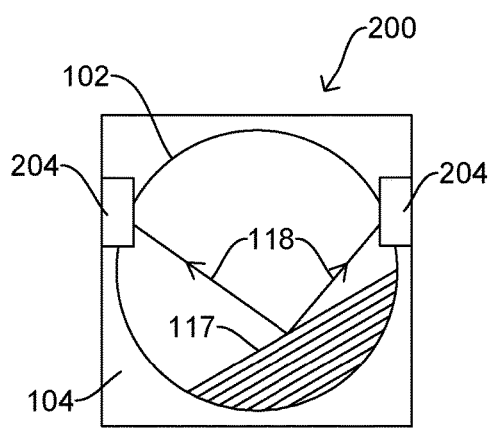
FIG. 2B is a cross-sectional view of the kiln gasifier illustrated in FIG. 2A.

According to one example of the technology illustrated in FIG. 2A, the kiln gasifier 200 may include the thermal sensor 204 that is mounted at the end 104. According to one example, the end 104 may be stationary such that it does not rotate with the rotating body 102 of the refractory-lined rotary kiln gasifier 200. According to one example, the thermal sensor 204 may detect infrared radiation 118 radiated from a surface of the solid bed 117. FIG. 2B illustrates a cross-sectional view of the kiln gasifier 200 during operation, with the solid bed 117 shown shifted in a counterclockwise direction during a counterclockwise rotation of the body 102. According to one example, the thermal sensor 204 may be mounted to the end 104 at an upper portion of the body 102. One of ordinary skill in the art will readily appreciate that a variety of devices and techniques may be employed to monitor a surface temperature profile of particles provided along the length of the kiln gasifier 200. Furthermore, one of ordinary skill in the art will readily appreciate that the surface of the solid bed 117 may additionally radiate in the visible range.

According to one example, opacity of the gases within the kiln gasifier 200 may obscure infrared radiation 118 radiating from the solid bed 117 from reaching the thermal sensor 204. One of ordinary skill in the art will readily appreciate that two or more thermal sensors 204 may be provided at locations within the kiln gasifier 200 to ensure a clear line-of-sight between the thermal sensor 204 and the solid bed 117. For example, two thermal sensors 204 may be mounted at opposite sides of the end 104 to provide different paths for obtaining temperature value readings of the solid bed 117. Alternatively, sight ports may be mounted on the ends 104,106 of the kiln gasifier 200 to provide a clear line-of-sight between the thermal sensor 204 and the solid bed 117. According to one example, the processor 202 may communicate with the thermal sensors 204 to determine a surface temperature of the solid bed 117. According to one example, the thermal sensors 204 may be provided within the input and output ports to measure temperature values of products passing therethrough. For example, a thermal sensor may be provided in the flow rate controller 210 to measure a temperature value of the fuel gas that exits the kiln gasifier 200 through the second outlet port 116.

According to one example, the processor 202 may receive data signals from the thermal sensors 204 to control temperature profiles within the zones A-D of the kiln gasifier 200. According to one example, the processor 202 may control the temperature profiles within the zones A-D by controlling the flow rate controllers 206, 212 that regulate a feed rate of solid waste entering through the first inlet port 110 and a feed rate of air and additional gases entering through the second inlet port 114. With respect to additional gases, these may include oxygen enriched air, recirculated flue gas, or steam, among other gases. Additionally, the processor 202 may control the temperature profiles within the zones A-D by controlling the rotation rate of the kiln gasifier 200. In this way, the processor 202 may be programmed to control temperatures and gasification rates within the kiln gasifier 200.

According to one example, the processor 202 may communicate with the thermal sensor 204, thermal sensors provided within the flow rate controllers 203-212, and the flow rate controllers 203-212 to control proportions of the oxidant gas mixture in order to create and maintain an overlap of the aforementioned and described zones. According to one example, based on the temperature value readings, the processor 202 may control a flow of the recycled flue gas to provide a modulating effect on a peak temperature within the zones A-D such that an excessively high peak temperature from the localized exothermic combustion reaction may be avoided. According to one example, the processor 202 may communicate with the thermal sensor 204, the thermal sensors provided within the flow rate controllers 203-212, and the flow rate controllers 203-212 to process the waste or the biomass at an oxidant-to-fuel ratio that is substantially below complete combustion stoichiometry. For example, the processor may be programmed with instructions that maintain the oxidant-to-fuel ratio in a range of 20% to 70% of complete combustion stoichiometry. More particularly, the processor may be programmed with instructions that maintain the oxidant-to-fuel ratio in a range of 30-35% of complete combustion stoichiometry. According to one example, components of the kiln gasifier 200 may be controlled to produce a carbonless, inert, non-leachable, non-hazardous ash or inorganic granular material aggregate that may have beneficial uses.

According to one example, the processor 202 may control temperature profiles within each of zones A-D to achieve sub-combustion stoichiometric conversion of the residual carbon that is present in the solids 117. For example, the processor 202 may control temperature profiles to sustain a corresponding zone in a temperature range that allows gasification by carbon dioxide and water vapor through mass transfer only. In this case, gasification performed using carbon dioxide and water vapor is not kinetically limited. According to one example, the processor 202 may limit temperature ranges in one of more zones to achieve sintering of the inorganic components provided therein, without slagging. According to one example, the temperature range is dependent upon the inorganic species that comprise the residual ash composite material. According to one example, the inorganic species that have lower sintering temperatures tend to catalyze the carbon dioxide and water vapor gasification reactions with the char-ash residue. Furthermore, these inorganic species typically catalyze reactions with the entire water gas components of the fuel gas mixture that form at lower temperatures than solids that sinter at a higher temperature, while materials travel from zone B to zone C to zone D.

According to one example, the processor 202 may communicate with the flow rate controllers 203-212 to adjust a volume of gases that flow through the kiln gasifier 200 in order to minimize per unit mass of processed fuel. In this way, the kiln gasifier 200 may be controlled to produce a clean fuel gas and a carbonless, inert, non-leachable, non-hazardous ash or inorganic granular material. According to one example, the technology described herein enables smoothing over of statistical fluctuations that occur in processing solid waste and biomass. For example, these statistical fluctuations may be associated with moisture content, inorganic composition, and heating value of the combustible fraction of the fuel.

While the examples described herein are directed to a counter-current configuration between the gaseous oxidant and the solid waste, the technology may employ an oxidant combustion stoichiometry that achieves complete carbon utilization of the solid waste or biomass in a kiln having a co-current configuration. Operating under an assumption that a superficial gas velocity determines a maximum practical operating limit associated with the onset of significant entrainment of finer particulates, a kiln size may be selected for the co-current configuration that is roughly proportional to a square root of the gas flow rates used to process a broad range of waste materials in this manner. According to one example, a co-current design that performs complete combustion may have a diameter that is at least 50% greater than the counter-current configuration and that operates effectively at 30% to 35% of complete combustion stoichiometry.

According to one example, a simplified process analytical model was used to compute heat and material balances across each zone and across the overall system. The model demonstrated that the kiln gasifier 200 can sustain a time averaged steady state output rate of energy in the fuel gas generated within a narrow band of energy content. The model demonstrates that industrial and commercial applications, ranging from steam and base-load power generation to chemical synthesis may employ the design and control methodology of the kiln gasifier 200 to attain overall plant integration requirements.

Figure 3:
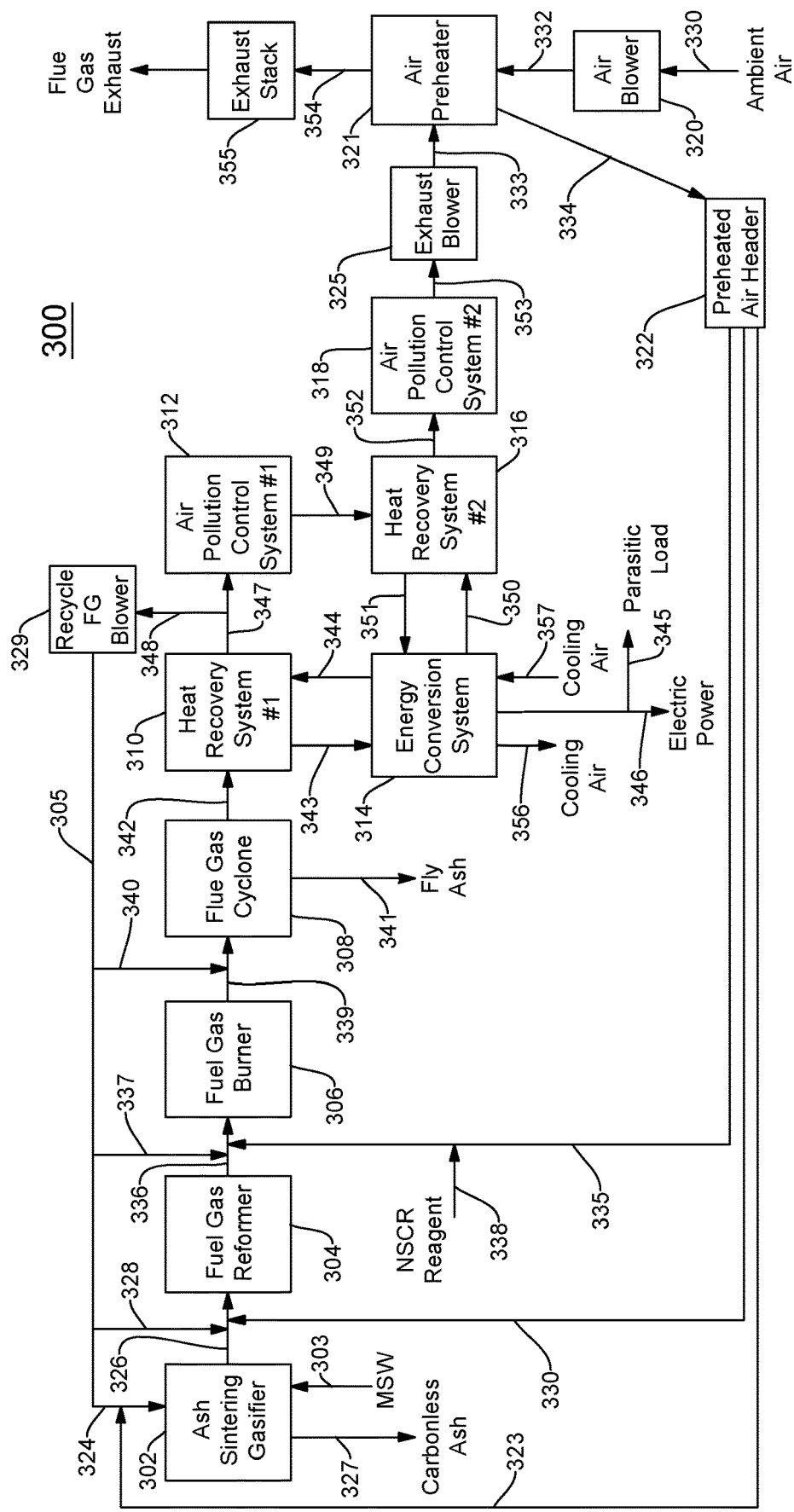
FIG. 3 illustrates a gasification system according to one example of the technology.

FIG. 3 illustrates a gasification system 300 according to one example of the technology that includes an ash sintering gasifier 302, a fuel gas reformer 304, a fuel gas burner 306, a fuel gas cyclone 308, a primary heat recovery system 310, a primary air pollution control system 312, an energy conversion system 314, a secondary heat recovery system 316, a secondary air pollution control system 318, among other components. According to one example, the gasification system 300 provides environmentally compliant conversion of solid waste or biomass for use in power generation. The gasification system 300 may utilize kiln redundancy to provide high on-stream factor capability. According to one example, the gasification system 300 is a waste-to-energy plant that provides both air pollution compliance at low pollution per unit of energy rate utilized and a carbonless, inert, virtually non-leachable, non-hazardous ash or inorganic granular material aggregate. According to one example, the residual mineral material may be used as an aggregate material in cementitious products. Alternatively, the cooled inert ash or aggregate may be safely disposed in a landfill. In this way, the residual mineral material is a value added product rather than an environmental liability.

According to one example, fuel 301 such as refuse derived fuel ("RDF") may be deposited into the ash sintering gasifier 302 via a duct 303. The fuel 301 may include MSW, shredded waste, source separated waste, construction and demolition debris, light combustibles, medical waste and/or biomass, or the like. Furthermore, the fuel 301 may include solid recovered fuel from sorted municipal solid waste, gasified municipal solid waste char residue, gasified solid recovered fuel from gasified sorted municipal solid waste char residue, commercial solid waste, gasified commercial solid waste char residue, source separated commercial waste, gasified source separated commercial waste char residue, a combustible portion of sorted construction and demolition debris, biomass or agricultural solid waste, gasified biomass or agricultural solid waste char residue, or gasified combustible portion of sorted construction and demolition debris char residue. According to one example, the fuel 301 may be made up of materials that contain carbon, hydrogen, oxygen, nitrogen, sulfur, chlorine, as well as other elements found in the various forms of solid waste. For example, the fuel 301 also may include elements such as phosphorus, silicon, and aluminum. The fuel 301 may be blended with an auxiliary fuel or a higher energy content fuel such as tire shreds, oil, or the like, to promote combustion. According to one example, the fuel 301 may be stored in a feeding bin such as an automated feeding bin or the like.

According to one example, the fuel 301 may be transported into the ash sintering gasifier 302 via a feeder such as a ram or compactor style feeder, a conveyor belt, an auger, a cork screw, a gravity chute, or a combination of these feeding devices, among other feeding devices. According to one example, the feeder may be fluidly coupled to the ash sintering gasifier 302. According to one example, the ram style feeder may be used to convey the waste or fuel 301 into the sintering gasifier 302 without pre-shredding the solid waste. According to one example, the ram style feeder may be used to smooth out any cyclic peaks in fuel gas enthalpy for use with applications such as power generation in a Rankine cycle engine that provides a sufficient surge storage capacity for the heat transfer fluid. According to an alternative example, the waste fuel 301 may be conveyed using an auger style feeder that offers a uniform dynamic behavior for the sintering gasifier 302. According to another example, the waste fuel 301 may be conveyed using a combined compactor and auger style feeder that offers a more uniform dynamic behavior for the sintering gasifier 302.

According to one example, the gasification system 300 may feed sub-stoichiometric quantities of air into the ash sintering gasifier 302, which may be structurally similar to the kiln gasifier 200 described above. According to one example, the sintering gasifier 302 may include a processor that communicates with flow rate controllers to regulate a feed rate of solid waste entering the sintering gasifier 302 and a feed rate of air and additional gases entering the sintering gasifier 302. Additionally, the processor may communicate with a motor that regulates a rotation rate of the sintering gasifier 302. In this way, the processor may control temperature profiles within the zones A-D of the sintering gasifier 302. According to one example, the processor may be programmed to control temperatures and gasification rates within the sintering gasifier 302 to reduce or eliminate pollutant formation. According to one example, the sintering gasifier 302 may provide complete carbon conversion, which may result in an inert ash product.

According to one example, significant temperature differences may exist between the solids and gases that travel through each zone of the sintering gasifier 302. Furthermore, the temperature values of both the solids and the gases may change upon crossing into different zones. With respect to a gas temperature operating range, the temperature values within zones A-D of the sintering gasifier 302 may operate in a range between approximately ambient temperature and 2400° F., for example. According to one example, the oxidant gases may enter zone A at approximately 200° F., may enter zone B at approximately 1300° F., may enter zone C at approximately 2200° F., may enter zone D at approximately 1600° F., and may exit the sintering gasifier 302 at approximately 1400° F. According to one example, the solids may enter zone D at approximately ambient temperature, may enter zone C at approximately 1100° F., may enter zone B at approximately 1900° F., may enter zone A at approximately 2000° F., and may exit the sintering gasifier 302 at approximately 1200° F. One of ordinary skill in the art will readily appreciate that the operating temperature ranges may vary depending on compositions of the solid waste and the gaseous oxidant products. One of ordinary skill in the art further will readily appreciate that the operating temperature values of the zones may fall outside these ranges.

According to one example, the air sources may include an air blower 320, an air preheater 321, and an air header 322, among other air sources. The air blower 320 may force air into a pressure head that supplies a total amount of influent thermal process air to the gasification system 300. According to one example, the air supplied by the air blower 320 may be heated in the air pre-heater 321 using hot product flue gas exhaust received from a discharge stream of an exhaust blower 325. A duct 332 may be provided to fluidly couple the air blower 320 and the air preheater 321. Furthermore, a duct 333 may be provided to fluidly couple the exhaust blower 325 and the air preheater 321. According to one example, the thermal process air may be directed from the air preheater 321 into the air header 322 via a duct 334 for distribution to various components that may employ thermal process air. Alternatively, one of ordinary skill in the art will readily appreciate that the gasification system 300 may operate using non-heated ambient air. In this case, the air preheater 321 may be bypassed or omitted. For example, an outlet of the air blower 320 may be fluidly coupled directly to an inlet of the air header 322.

According to one example, the sintering gasifier 302 may be fluidly coupled to the air header 322 via a duct 323 that delivers pre-heated air flows. According to one example, the pre-heated air flow may be combined in duct 324 with a recycled flue gas received in ducts 305,324 from a recycled flue gas blower 329 prior to entering the sintering gasifier 302. According to one example, the fuel gas product generated in the sintering gasifier 302 may be delivered to the fuel gas reformer 304 through a duct 326. According to one example, the ash product generated in the sintering gasifier 302 may be expelled through an outlet 327 using a conveyor, an auger, or the like.

According to one example, the fuel gas generated in the gasification system 300 is burned and a portion of the flue gas may be recirculated to control a temperature of the sintering gasifier 302 in order to produce a non-hazardous ash by-product. According to one example, the gasification system 300 also may produce a raw fuel gas whose energy may be recovered by established techniques. According to one example, a portion of the enthalpy from the fuel gas is used to generate steam that is applied to control the axial temperature profile within the sintering gasifier 302.

According to one example, the fuel gas reformer 304 may be fluidly coupled to the air header 322 via a duct 330 that delivers pre-heated air flows. According to one example, the pre-heated air flow may be combined in duct 326 with the fuel gas product and the recycled flue gas received in ducts 305,328 from a recycled flue gas blower 329 prior to entering the fuel gas reformer 304. According to one example, the recycled flue gas maintains the temperature in the fuel gas reformer 304 at a temperature range at which tars are reformed and fuel NOx forming species are thermally decomposed to molecular nitrogen. According to one example, the fuel gas reformer 304 thermally cracks and reforms volatilized hydrocarbons that are generated in the sintering gasifier 302 to form predominantly water gas species. According to one example, the water gas species may include hydrogen, water, carbon monoxide, and carbon dioxide, along with minor quantities of light hydrocarbon gases and readily combustible soot carbon particles.

According to one example, the fuel gas reformer 304 may minimize formation of prompt NOx. According to one example, the fuel gas reformer 304 may mitigate adverse consequences such as formation of thermal NOx that results from introducing higher than normal fuel gas feed temperature into the fuel gas burner 306 by burning and cooling the low energy content reformed fuel gas with a blend of warm recycled flue gas and ambient air. Accordingly, the fuel gas reformer 304 may be configured to limit total NOx formation in the gasification system 300. According to one example, the fuel gas reformer 304 may use oxidants and water vapor present in the injected gases to partially oxidize and reform tars and other volatile organic compounds received from the sintering gasifier 302. According to one example, gaseous ammonia and other nitrogen containing gas by-products received in the fuel gas product may be decomposed to molecular nitrogen in the fuel gas reformer 304 by sub-combustion stoichiometric thermal decomposition reactions. According to one example, the fuel gas reformer 304 mitigates one of the sources of NOx formation in the downstream fuel gas burner 306 from the organic nitrogen in the fuel gas product.

According to one example, the fuel gas reformer 304 may provide a reducing gas atmosphere that substantially thermally decomposes any ammonia that was predominantly formed in the sintering gasifier 302. According to one example, the fuel gas reformer 304 may substantially thermally decompose the ammonia into nitrogen and hydrogen. According to one example, the fuel gas reformer 304 may convert the ammonia produced from organic nitrogen provided in the fuel 301 to minimize production of fuel NOx. Accordingly, the gasification system 300 substantially eliminates a precursor to fuel NOx formation. According to one example, any inert gases such as nitrogen and argon provided within the fuel gas reformer 304 may remain virtually un-reacted.

According to one example, the fuel gas burner 306 may be fluidly coupled to the air header 322 via a duct 335 that delivers pre-heated air flows. According to one example, the pre-heated air flow may be combined in duct 336 with the reformed fuel gas and the recycled flue gas received in ducts 305,337 from a recycled flue gas blower 329 prior to entering the fuel gas burner 306. According to one example, the recycled flue gas maintains the temperature in the fuel gas burner 306 in a temperature range at which all organics are destroyed while minimizing NOx formation. According to one example, the fuel gas burner 306 may be dimensioned to provide the reformed fuel gas with sufficient gas residence time at a sufficient temperature to completely combust all carbonaceous and hydro-carbonaceous materials. For example, the fuel gas burner 306 may be dimensioned to provide up to two or more seconds of gas residence time at a temperature between 1500° F. to 1900° F. in order to complete combustion of all organic species while minimizing production of thermal NOx. According to one example, the duct 335 may be fluidly coupled to a non-selective catalytic reduction ("NSCR") reagent source 338 that injects reagent prior to the air stream entering the fuel gas burner 306.

According to one example, the fuel gas burner 306 may be controlled to limit the oxygen content and the temperature therein so as to minimize NOx formation. For example, the fuel gas burner 306 may be controlled to adjust the temperature to approximately under 1900° F. by adjusting a ratio of ambient air and recycled flue gas received through ducts 335,337, respectively. According to one example, the temperature in the fuel gas burner 306 may be selected to limit thermal NOx formation to insignificant levels, while providing sufficient heat in the fuel gas burner 306 to quickly destroy dioxins, furans, and any remaining carbonaceous and hydro-carbonaceous material. One of ordinary skill in the art will readily appreciate that an optimal ratio of reformed fuel gas from the reformer 304, air from the air source 322, and the recycled flue gas originating from the recycled flue gas blower 329 will depend on multiple factors including a composition of the reformed fuel gas, an amount of excess oxygen in the recycled flue gas, and the temperature of each stream, among other factors. One of ordinary skill in the art will readily appreciate that the fuel gas burner 306 may be maintained at any desired temperature, below the adiabatic flame temperature of the fuel gas. According to one example, the fuel gas burner 306 may control combustion of the reformed fuel gases to minimize production of thermal NOx.

According to one example, the fuel gas burner 306 may be fluidly coupled to a flue gas cyclone 308 via a duct 339 that delivers flue gas. According to one example, the flue gas may be combined in duct 339 with the quench recycled flue gas received in ducts 305,340 from a recycled flue gas blower 329 prior to entering the flue gas cyclone 308. According to one example, the quench recycled flue gas cools the flue gas received from the fuel gas burner to a temperature at which most low-melting eutectics in the fly ash solidify. According to one example, the flue gas cyclone 308 removes particulates from the flue gas. According to one example, the particulates are removed from the gasification system 300 by a dipleg 341. According to one example, the flue gas that exits the flue gas cyclone 308 may be transported to the primary heat recovery system 310 through a duct 342. According to one example, the primary heat recovery system 310 may include an oil heater, a boiler, or a water heater, depending on the application.

According to one example, the primary heat recovery system 310 may be fluidly coupled to an energy conversion system 314 via heat transfer fluid pipes 343,344. According to one example, the heat transfer fluid pipe 343 conveys heat transfer fluid to the energy conversion system 314. A portion of thermal energy provided in the heat transfer fluid that flows through the heat transfer fluid pipe 343 may be transferred to a working fluid that expands to drive a turbine. In the case of an organic Rankine cycle engine, the turbine may be used to generate power. For an example in which the working fluid is water, steam generated from the water may be expanded in a turbine to generate power in a Rankine cycle. According to one example, the working fluid in the form of steam may be condensed either directly with ambient air or indirectly by cooling the working fluid in a water-cooled exchanger. The warmed water may be cooled further using ambient air.

According to one example, the energy conversion system 314 may recirculate heat transfer fluid to the primary heat recovery system 310 via the heat transfer fluid pipe 344 for reheating. When the energy conversion system 314 includes electrical power generation, a portion of the generated electrical power is diverted to the gasification system 300 via utility lines 345 and consumed internally as the parasitic load. According to one example, the balance of the generated electrical power is available to export to the local power grid via utility lines 346. According to another example, the heat transfer fluid may be utilized to heat water without power generation such as in a hot water heater application.

According to one example, the primary heat recovery system 310 may be fluidly coupled to a primary air pollution control system 312 via a duct 347 and the recycled flue gas blower 329 via a duct 348. According to one example, the primary heat recovery system 310 may include a heat exchanger that transfers a portion of sensible heat from the quench flue gas to the energy conversion system 314. The sensible heat corresponds to changes in temperature of the gas without a change in phase. Alternatively, the primary heat recovery system 310 may include a boiler, among other heat recovery systems. The heat recovery system 310 may generate product steam that is delivered to the energy conversion system 314 that may be used to produce electrical power. Alternatively, the heat recovery system 310 may include a heat recirculating thermal oil that drives an organic Rankine cycle system that generates electrical power. In an organic Rankine cycle, instead of using steam as the working fluid, a refrigerant is used in a closed loop in which the refrigerant is heated by a heat transfer fluid that extracts the sensible heat from the hot flue gases. The refrigerant expands as it is heated and drives a turbine whose shaft rotates to produce power in a generator. According to one example, the heat recovery system 310 may operate with an exhaust temperature in a range of 600° F. to 800° F., for example. According to one example, the heat recovery system 310 may operate at a preferred exhaust temperature of 700° F. when optimizing subsequent SCR treatment for NOx emissions reduction in the primary air pollution control system 312.

According to one example, a portion of the recycled flue gas is diverted via duct 348 to the recycled flue gas blower 329 for recirculation to the sintering gasifier 302, the fuel gas reformer 304, the fuel gas burner 306, and the flue gas cyclone 308. According to one example, a balance of the flue gas is diverted via duct 347 to the primary air pollution control system 312 and via duct 349 to the secondary heat recovery system 316. The primary air pollution control system 312 is typically employed for post formation control of most combustion products from MSW combustion systems such as NOx emissions, particulates, acids, heavy metals, volatile organic compounds, or the like. For example, electrostatic precipitators as well as fabric filters/bag-houses may be effective for removing particulates. Dry scrubbing is commonly used to remove sulfur oxides and hydrogen halides. Injection of activated carbon upstream of the particulate collection devices is effective for removal of heavy metals and volatile organic compounds. According to one example, the primary air pollution control system 312 may include dry sorbent injection, a CO selective catalytic reduction ("SCR") catalyst bed, a NOx SCR catalyst bed, and an electrostatic precipitator, among other air pollution control systems. SCR units are typically employed to meet emissions standards. However, these devices are expensive and provide a large footprint for MSW combustion systems.

According to one example, the primary air pollution control system 312 may be fluidly coupled to a secondary heat recovery system 316 via a duct 349. According to one example, the secondary heat recovery system 316 may include a heat exchanger that transfers a portion of sensible heat from the quench flue gas to the energy conversion system 314. According to one example, the flue gas cooling may be limited to a temperature of approximately 482° F. to provide sufficient temperature difference between the cooled heat transfer fluid that originates from the energy conversion system 314 via a pipe 350. According to one example, hot fluid is sent back to the energy conversion system 314 via a pipe 351. According to one example, the secondary heat recovery system 316 may be a simple hot water heater.

According to one example, the flue gas discharged from the secondary heat recovery system 316 via a duct 352 may be treated in a secondary air pollution control system 318 that may include dry sorbent injection, activated carbon injection, and a bag house, or the like.

According to one example, the flue gas that exits the secondary air pollution control system 318 via duct 353 is clean flue gas that meets regulatory stack emissions and is annual inventory compliant to an air permit secured under minor source standards. The clean flue gas may be drafted into exhaust blower 325 via duct 353 and may be fluidly coupled via duct 333 to the air pre-heater 321 for sensible heat recovery. According to one example, the flue gas discharged from the air preheater 321 is conveyed by a duct 354 into an exhaust stack 355 for discharge to the atmosphere.

Figure 4A:
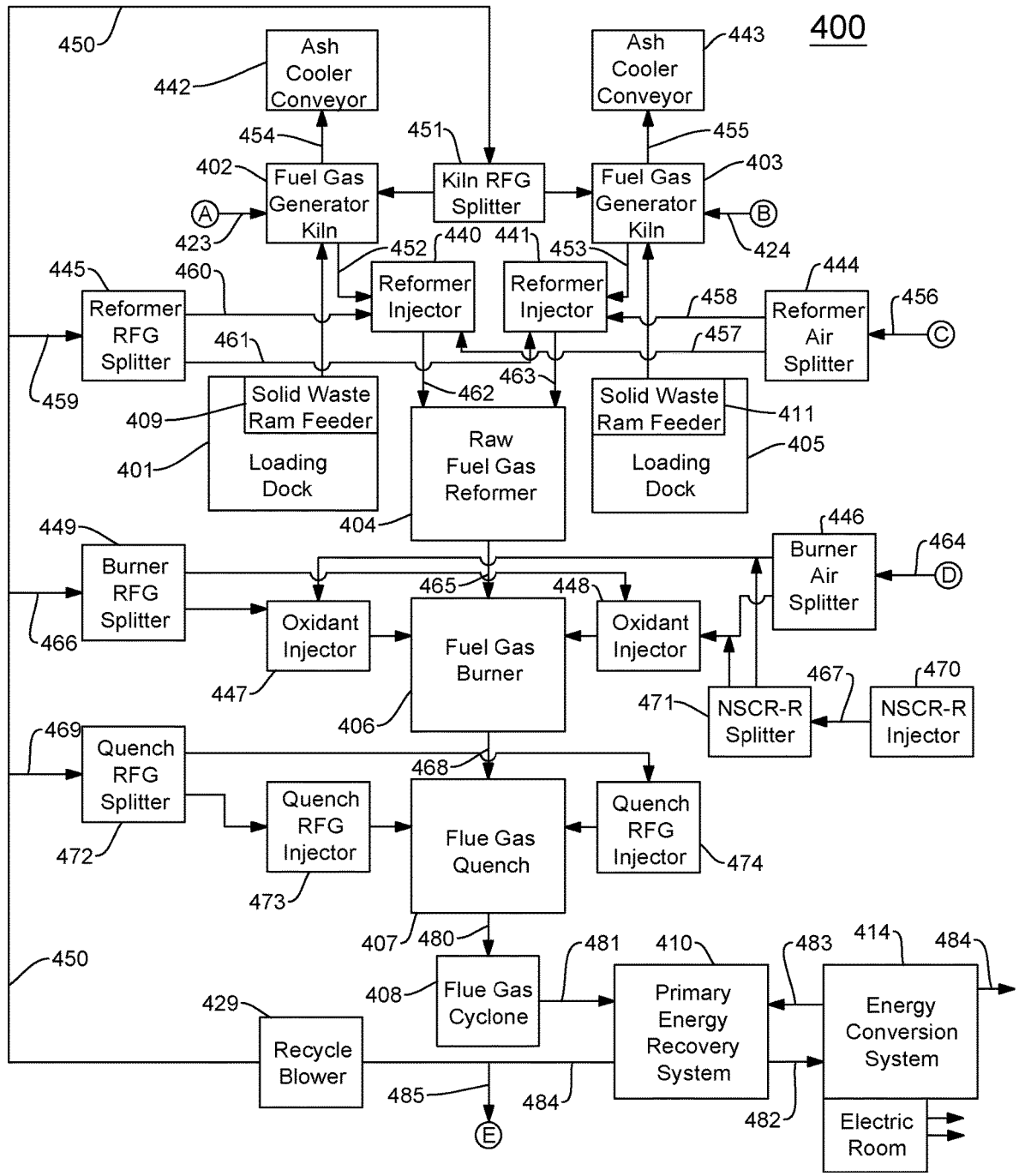
FIG. 4A illustrates a gasification system that employs parallel rotary kilns, flue gas recycling, and various air pollution cleanup processes according to one example of the technology.
Figure 4B:
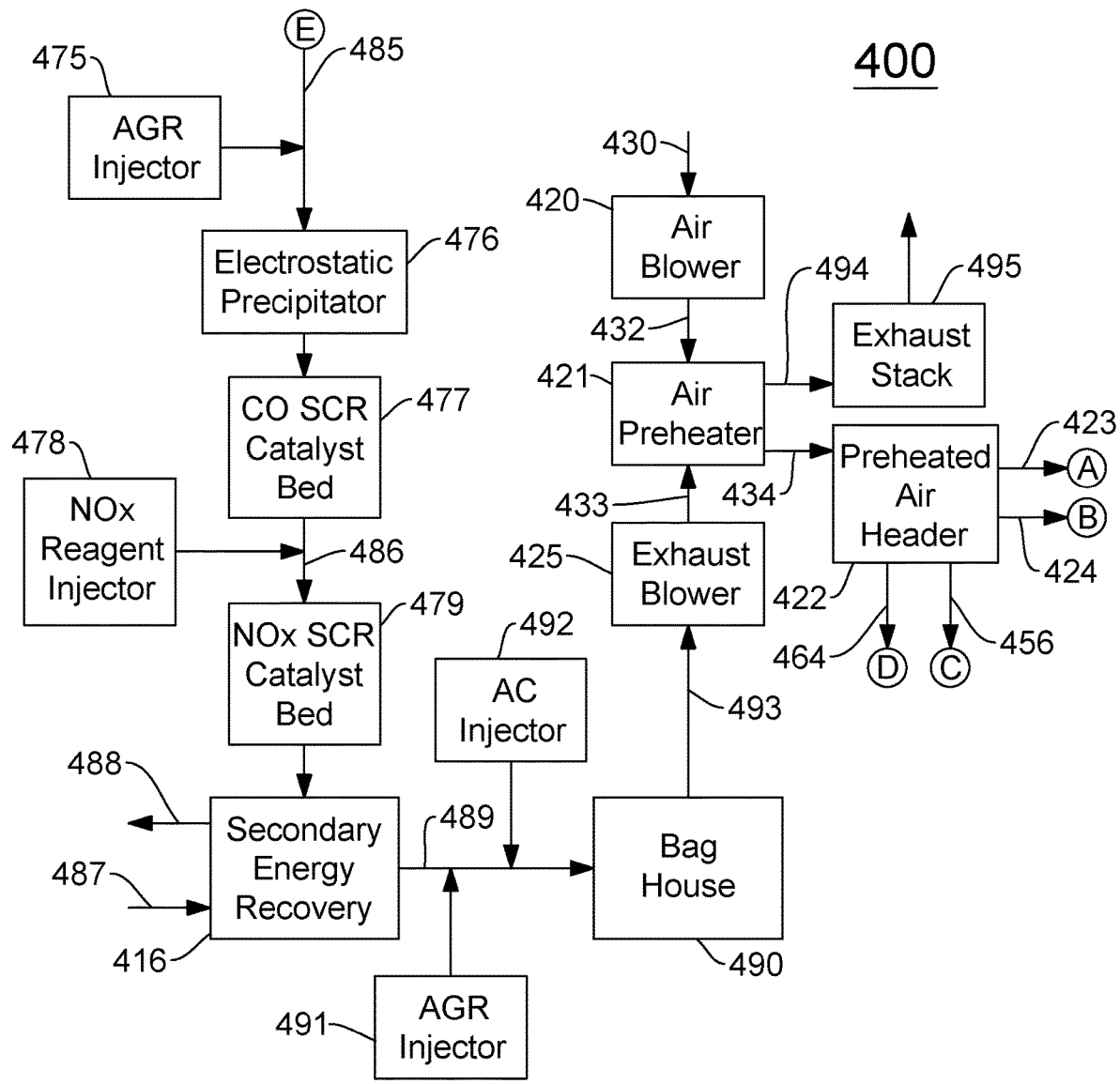
FIG. 4B illustrates a gasification system that employs parallel rotary kilns, flue gas recycling, and various air pollution cleanup processes according to one example of the technology.

FIGS. 4A and 4B illustrate a gasification system 400 according to another example of the technology that includes a pair of parallel arranged fuel gas generating kilns 402, 403, a fuel gas reformers 404, a fuel gas burner 406, a fuel gas quench 407, a fuel gas cyclone 408, a primary heat recovery system 410, an energy conversion system 414, and a secondary heat recovery system 416, among other components. According to one example, the gasification system 400 provides environmentally compliant conversion of solid waste or biomass for use in power generation. The gasification system 400 utilizes kiln redundancy to provide high on-stream factor capability. According to one example, the gasification system 400 is a waste-to-energy plant that provides both air pollution compliance at low pollution per unit of energy rate utilized and a carbonless, inert, virtually non-hazardous ash or inorganic granular material aggregate. According to one example, the residual mineral material may be used as an aggregate material in cementitious products. Alternatively, the cooled inert ash or aggregate may be safely disposed in a landfill. In this way, the residual mineral material is a value added product rather than an environmental liability.

According to one example, a gasifier in a single-stage gasification system may be operated at a higher temperature with shorter reaction times as compared to gasifier in a multi-stage gasification system. According to one example, a rotating kiln may be employed in a single-stage gasification system, without the need for a second gasification stage. According to this example, the rotating kiln may operate at a sufficiently high temperature, with sufficient reaction time, to ensure complete gasification of the waste. For example, MSW may be fed into a rotating kiln, which may produce an inert ash and a fuel gas. According to one example, the fuel gas may be utilized in a same manner as the fuel gas produced by a multi-stage system.

According to one example, one or more loading docks 401,405 are provided to receive fuel such as refuse derived fuel ("RDF") that is deposited into corresponding kilns 402,403 via corresponding feed systems 409,411. The fuel may include MSW, shredded waste, source separated waste, construction and demolition debris, light combustibles, medical waste and/or biomass, or the like. According to one example, the fuel may be transported into kilns 402,403 by corresponding feed systems 409,411 that may include a conveyor belt, a ram, a compactor, an auger, a cork screw, a gravity chute, or the like. According to one example, the feed systems 409,411 may be fluidly coupled to the corresponding kilns 402,403. According to one example, the fuel may be made up of materials that contain carbon, hydrogen, oxygen, nitrogen, sulfur, chlorine, as well as other elements found in the various forms of solid waste. For example, the fuel also may include elements such as phosphorus, silicon, and aluminum. The fuel may be blended with an auxiliary fuel or a higher energy content fuel such as tire shreds, oil, biodiesel expeller residue, or the like, to promote combustion. According to one example, the fuel may be stored in a feeding bin such as an automated feeding bin or the like.

According to one example, the gasification system 400 may feed sub-stoichiometric quantities of air into the kilns 402,403 that are structurally similar to the kiln gasifier 200 described above. According to one example, the kilns 402, 403 may include processors that communicate with flow rate controllers to regulate a feed rate of solid waste entering the corresponding kilns 402,403 and a feed rate of air and additional gases entering the corresponding kilns 402,403. Additionally, the processors may control a rotation rate of the kilns 402,403. In this way, the processors may control temperature profiles within the zones A-D of the corresponding kilns 402,403. According to one example, the processors may be programmed to control temperatures and gasification rates within the corresponding kilns 402,403 to reduce or eliminate pollutant formation. According to one example, the kilns 402,403 may provide complete carbon conversion, which may result in an inert ash product.

According to one example, significant temperature differences may exist between the solids and gases that travel through each zone of the kilns 402,403. Furthermore, the temperatures of both the solids and the gases may change upon crossing into a different zone. With respect to a temperature range of the gases during operation, the temperatures within zones A-D of the kilns 402,403 may operate in a range of from ambient temperature to 2400° F., for example. According to one example, the gases may enter zone A at 200° F., may enter zone B at 1300° F., may enter zone C at 2200° F., may enter zone D at 1600° F., and may exit the sintering gasifier 302 at 1400° F. According to one example, the solids may enter zone D at ambient temperature, may enter zone C at 1100° F., may enter zone B at 1900° F., may enter zone A at 2000° F., and may exit the kilns 402,403 at 1200° F. One of ordinary skill in the art will readily appreciate that the operating temperature ranges will depend on compositions of the solid waste, kiln rotation rate, and the gaseous oxidant products. One of ordinary skill in the art will further readily appreciate that the operating temperatures of the zones may fall outside these ranges.

According to one example, the air sources may include an air blower 420, an air preheater 421, and an air header 422, among other air sources. According to one example, the air blower 320 may receive ambient air from a duct 430. The air blower 420 may force air into a pressure head that supplies a total amount of influent thermal process air to the gasification system 400. According to one example, air supplied by the air blower 420 may be heated in the air pre-heater 421 using hot product flue gas exhaust received from a discharge stream of an exhaust blower 425. A duct 432 may be provided to fluidly couple the air blower 420 and the air preheater 421. Furthermore, a duct 433 may be provided to fluidly couple the exhaust blower 425 and the air preheater 421. According to one example, the thermal process air may be directed from the air preheater 421 into the air header 422 via a duct 434 for distribution to various components that may employ thermal process air. One of ordinary skill in the art will readily appreciate that the gasification system 400 may operate using non-heated ambient air. In this case, the air preheater 421 may be bypassed or omitted. For example, an outlet of the air blower 420 may be fluidly coupled directly to an inlet of the air header 422.

According to one example, the kiln 402 may be fluidly coupled to the air header 422 via a duct 423 that delivers pre-heated air flows. According to one example, the kiln 403 may be fluidly coupled to the air header 422 via a duct 424 that delivers pre-heated air flows. According to one example, additional ducts may be provided for kiln operational redundancy. According to one example, the pre-heated air flow may be combined in duct 450 with a recycled flue gas received from a recycled flue gas blower 429 prior to entering the kilns 402,403 via kiln recycled flue gas splitter 451.

According to one example, fuel gas product generated in kilns 402,403 may be transferred into fuel gas reformer injectors 440,441 via ducts 452,453. Alternatively, either fuel gas reformer injectors 440,441 may be used for kiln operational redundancy. According to one example, ash product may exit the kilns 402,403 via ducts 454,455 and may be directed into ash cooler conveyors 442,443, respectively. Alternatively, either ash cooler conveyor 442,443 may be used for kiln operational redundancy. According to one example, the ash product generated in the kilns 402,403 may be expelled using a conveyor, an auger, or the like.

According to one example, the fuel gas product generated in the kilns 402,403 may be delivered to the fuel gas reformer 404 through the corresponding reformer injectors. According to one example, preheated air flows originating from the air header 422 may be provided to a fuel gas reformer air splitter 444 through a duct 456. According to one example, the fuel gas reformer air splitter 444 may be fluidly coupled to the fuel gas reformer injectors 440,441 via ducts 457, 458. According to one example, recycled flue gas that originates from the recycle blower 429 may be provided to a reformer recycled flue gas splitter 445 through a duct 459. According to one example, the reformer recycled flue gas splitter 445 may be fluidly coupled to the fuel gas reformer injectors 440,441 via ducts 460, 461. According to one example, the preheated air flows and the recycled flue gas may be mixed together within the fuel gas reformer injectors 440,441. According to one example, the gas mixtures are then injected into the raw fuel gas reformer 404 via ducts 462,463. According to one example, the two mixture carrying ducts 462,463 may be physically coupled to the raw fuel gas reformer 404 on symmetrically opposite sides.

According to one example, the fuel gas reformer 404 minimizes formation of prompt NOx. According to one example, the fuel gas reformer 404 may mitigate adverse consequences such as formation of thermal NOx that results from introducing higher than normal fuel gas feed temperature into the fuel gas burner 406 by burning and cooling the low energy content reformed fuel gas with a blend of warm recycled flue gas and ambient air. Accordingly, the fuel gas reformer 404 may be configured to limit total NOx formation in the gasification system 400. According to one example, the raw fuel gas reformer 404 may be fluidly coupled to the fuel gas reformer injectors 440,441 via ducts 462,463. According to one example, the raw fuel gas reformer 404 may be operated under conditions that employ oxidants and water vapor present in the injected gases to partially oxidize and reform tars and other volatile organic compounds from the fuel gas product. According to one example, the recycled flue gas is controlled to maintain the temperature in the fuel gas reformer 404 within a temperature range that reforms tars and thermally decomposes fuel NOx forming species to molecular nitrogen. According to one example, the fuel gas reformer 404 thermally cracks and reforms volatilized hydrocarbons that are generated in the kiln 402,403 to form predominantly water gas species. According to one example, the water gas species may include hydrogen, water, carbon monoxide, and carbon dioxide, along with minor quantities of light hydrocarbon gases and readily combustible soot carbon particles.

According to one example, gasifying the nitrogen species provided in fuel fed to the kilns 402,403 forms gaseous ammonia and other nitrogen containing gas by-products. The technology described herein decomposes the gaseous ammonia and other nitrogen containing gas by-products into molecular nitrogen by sub-combustion stoichiometric thermal decomposition reactions. Accordingly, the technology described herein mitigates one of the sources of NOx formed in the downstream fuel gas burner 406, namely, NOx formation from fuel borne organic nitrogen. According to one example, the raw fuel gas reformer 404 may provide a reducing gas atmosphere that substantially thermally decomposes any ammonia that was predominantly formed in the kilns 402,403. According to one example, the raw fuel gas reformer 404 may substantially thermally decompose the ammonia into nitrogen and hydrogen. According to one example, the raw fuel gas reformer 404 may convert the ammonia produced from organic nitrogen provided in the fuel to minimize production of fuel NOx. Accordingly, the gasification system 400 may substantially eliminate a precursor to fuel NOx formation. According to one example, any inert gases such as nitrogen and argon provided within the raw fuel gas reformer 404 may remain virtually unreacted.

According to one example, the fuel gas burner 406 may be fluidly coupled to the raw fuel gas reformer 404 via a duct 465 and to the air header 422 via a duct 464 that delivers pre-heated air flows. According to one example, preheated air flows originating from the air header 422 are provided to a burner air splitter 446 through the duct 464. According to one example, the burner air splitter 446 may be fluidly coupled to oxidant injectors 447,448 via ducts. According to one example, recycled flue gas originating from the recycle blower 429 is provided to a burner recycled flue gas splitter 449 through a duct 466. According to one example, the burner recycled flue gas splitter 449 is fluidly coupled to the oxidant injectors 447,448 via ducts. According to one example, the preheated air flows and the recycled flue gas are mixed together within the oxidant injectors 447,448. According to one example, the gas mixtures are then injected into the fuel gas burner 406 via ducts.

According to one example, the reformed fuel gas that exits the raw fuel gas reformer 404 via duct 465 may be aspirated in the fuel gas burner 406 by the mixed air and recycled flue gas provided from the oxidant injectors 447, 448. According to one example, the fuel gas burner 406 may be dimensioned to provide the reformed fuel gas with sufficient gas residence time at a sufficient temperature to completely combust all carbonaceous and hydro-carbonaceous materials. For example, the fuel gas burner 406 may be dimensioned to provide up to two or more seconds of gas residence time at a temperature between 1500° F. to 1900° F. in order to complete combustion of all organic species while minimizing production of thermal NOx. According to one example, the ducts that carry gases out of the burner air splitter 446 may be fluidly coupled to a non-selective catalytic reduction ("NSCR") reagent source that injects reagent prior to the air stream entering the fuel gas burner 406. According to one example, an NSCR reagent ("NSCR-R") may be injected from an NSCR-R injector 470 into an NSCR-R splitter 471 via pipe 467. According to one example, the NSCR-R splitter 471 may include two output pipes that mix the NSCR-R into air ducts that feed the oxidant injectors 447,448. According to one example, NSCR-R may be mixed with the burner recycled flue gas in the oxidant injectors 447,448.

According to one example, the fuel gas quench 407 may be fluidly coupled to the fuel gas burner 406 via a duct 468. According to one example, recycled flue gas originating from the recycle blower 429 may be provided to a quench recycled flue gas splitter 472 through a duct 469. According to one example, the quench recycled flue gas splitter 472 may be fluidly coupled to the quench recycled flue gas injectors 473,474 via ducts. According to one example, the quench recycled flue gas injectors 473,474 may be fluidly coupled to the flue gas quench 407. According to one example, the recycled flue gas is then injected into the flue gas quench 407 via ducts. According to one example, the recycled flue gas cools the flue gas down to approximately 1400° F.

According to one example, the flue gas cyclone 408 may be fluidly coupled to the fuel gas quench 407 via a duct 480. According to one example, the flue gas cyclone 408 may collect dust from the flue gas entering the flue gas cyclone 408. According to one example, the flue gas that enters the flue gas cyclone 408 is received at a temperature below the temperature at which common low melting eutectics in the flue gas duct 481 will have solidified. Accordingly, any particles remaining in the flue gas that passes through the flue gas duct 481 will not stick on the cooler tube surfaces of the primary heat recovery system 410.

According to one example, a heat transfer fluid exits the primary heat recovery system 410 via a pipe 482 for delivery to a power generation system or an energy conversion system 414. A portion of the thermal energy in the heat transfer fluid may be transferred to a working fluid that is expanded to drive a turbine and generate power in the case of an organic Rankine cycle engine. According to another example, the working fluid may be water and steam that is expanded in a turbine to generate power in a Rankine cycle. According to one example, the working fluid subsequently may be condensed directly with ambient air. Alternatively, the working fluid subsequently may be condensed indirectly by having the working fluid cooled in a water-cooled exchanger with the warmed water being cooled by ambient air. According to one example, the heat transfer fluid that exits the energy conversion system 414 may be recirculated via a pipe 483 to the primary heat recovery system 410 for reheating. When the energy conversion system 414 includes electrical power generation, a portion of the generated electrical power is diverted to the gasification system 400 via utility lines 484 and consumed internally as the parasitic load. According to one example, the balance of the generated electrical power is available to export to the local power grid via utility lines. According to another example, the heat transfer fluid may be utilized to heat water without power generation such as in a hot water heater application.

According to one example, flue gas that exits the flue gas cyclone 408 via the duct 481 may dissipate a portion of sensible heat while heating the heat transfer fluid. The flue gas then exits the primary heat recovery system 410 as flue gas through a duct 484. According to one example, the flue gas duct 484 is divided in a duct tee with duct 484 entering the recycle blower 429 for recirculation to various components including the kilns 402,403, the raw fuel gas reform 404, the fuel gas burner 406, and the flue gas quench 407. According to one example, a second duct 485 may be fluidly coupled to a secondary heat recovery device 416 having a flue gas air pollution control.

According to one example, the recycle blower 429 pulls flue gas through the duct 484 for delivery to various components that are fluidly coupled to the duct 450. For example, flue gas may be delivered via duct 450 to the quench recycled flue gas splitter 472, the burner recycled flue gas splitter 449, the reformer recycled flue gas splitter 445, or the kiln recycled flue gas splitter 451, among other components.

According to one example, the portion of the total flue gas that exits the primary heat recovery system 410 via duct 485 may be injected with an acid gas absorbent reagent ("AGR") from an acid gas reagent injector 475 via a pipe. According to one example, a dry sorbent may be injected into duct 485 that provides sufficient gas residence time for acid gas sorption reactions to occur. According to one example, the duct 485 may discharge into an electrostatic precipitator 476 that removes 90% or more of the particulates, including a majority of any sub-micron size particulate material that have a strong tendency to aggregate and be captured. According to one example, removing dry sorption and particulates helps protect the selective catalytic reactors that follow from acid gas attacking and deactivating the catalyst beds as well as from particulates clogging the beds.

According to one example, an effluent flue gas duct may fluidly couple the electrostatic precipitator 476 with a carbon dioxide (CO) selective catalyst reactor ("SCR") bed 477 that treats the flue gas to destroy CO and volatile organic matter. According to one example, a flue gas discharge duct 486 fluidly couples the CO SCR bed 477 and a NOx selective catalytic reactor ("SCR") bed 479. A NOx reagent injector 478 is provided to inject aqueous ammonia into its flue gas discharge duct 486. According to one example, the flue gas is then treated in a NOx selective catalytic reactor ("SCR") bed 479 for reduction of NOx emissions for which the exhaust temperature of the primary heat recovery system 410 is designed to provide the flue gas in a temperature range of approximately 675° F. to 725° F. According to one example, the NOx SCR bed 479 may perform optimally in this temperature range. One of ordinary skill in the art will readily appreciate that the operating temperatures may fall outside this range.

According to one example, a second effluent flue gas duct may fluidly couple the NOx SCR bed 479 with a secondary heat recovery system 416 that extracts sensible heat. According to one example, the flue gas cooling may be limited to approximately 482° F. to provide a sufficient temperature difference between the cooled oil coming from the energy conversion system 414 via a pipe 487 and the hot oil being sent back to the energy conversion system 414 via a pipe 488.

According to one example, a second flue gas discharge duct 489 may fluidly couple the secondary heat recovery system 416 to a bag house 490. According to one example, the flue gas in the second flue gas discharge duct 489 may be treated with additional acid gas sorption reagent from an acid gas reagent ("AGR") injector 491 that is fluidly coupled to the second flue gas discharge duct 489 via a pipe. According to one example, an activated carbon sorbent may be injected from an activated carbon ("AC") injector 492 via a pipe. According to one example, the second flue gas discharge duct 489 may be dimensioned to provide sufficient gas residence time to capture residual acid gases that are present in the flue gas such as sulfur oxides and hydrogen halides, trace volatile organic compounds, and heavy metal hazardous air pollutants. According to one example, the acid gas sorption reagent and the activated carbon sorbent may travel to the bag house 141 to capture residual acid gases that are present in the flue gas such as sulfur oxides and hydrogen halides, trace volatile organic compounds, and heavy metal hazardous air pollutants, among other acid gases provided therein.

According to one example, the flue gas that exits the bag house 490 via duct 493 is clean flue gas that meets regulatory stack emissions and is annual inventory compliant to an air permit secured under minor source standards. The clean flue gas may be drafted into exhaust blower 425 and may be fluidly coupled via duct 433 to the air pre-heater 421 for sensible heat recovery. According to one example, the flue gas discharged from the air preheater 421 may be conveyed by a duct 494 into an exhaust stack 495 for discharge to the atmosphere.

According to one example, the present technology includes counter-current designs for the rotating kiln gasifiers 402,403, an axial temperature monitoring and control system, a high temperature reformer 404, a fuel gas burner 406, energy or heat recovery systems 410,416, a flue gas quench system 407, a flue gas air pollution control system, and a supervisory control and data acquisition ("SCADA") system. According to one example, the energy conversion system 414 may include an organic Rankine power cycle. According to one example, the primary and secondary energy recovery systems 410,416 may include oil heaters that supply heated oil to the organic Rankine power cycle. According to another example, the energy conversion system 414 may include a hot water heater rather than a more complex power generation process. One of ordinary skill in the art readily appreciates how the energy conversion system operates using an organic Rankine power cycle or a water heater, so a description is not provided herein.

According to one example, the Rankine cycle working fluid compensates for variability in waste calorific value by utilizing a heat energy surge storage capacity. According to one example, the gasification systems 300,400 may utilize fuel mixes from various combinations of sources such that a portion or all of the waste that is fed into the kiln is municipal solid waste, solid recovered fuel from sorted municipal solid waste, commercial solid waste, source separated commercial waste, the combustible portion of sorted construction and demolition debris, tires, or any other solid wastes that contains well above 1% of its content as inorganic, non-combustible materials.

Figure 5:
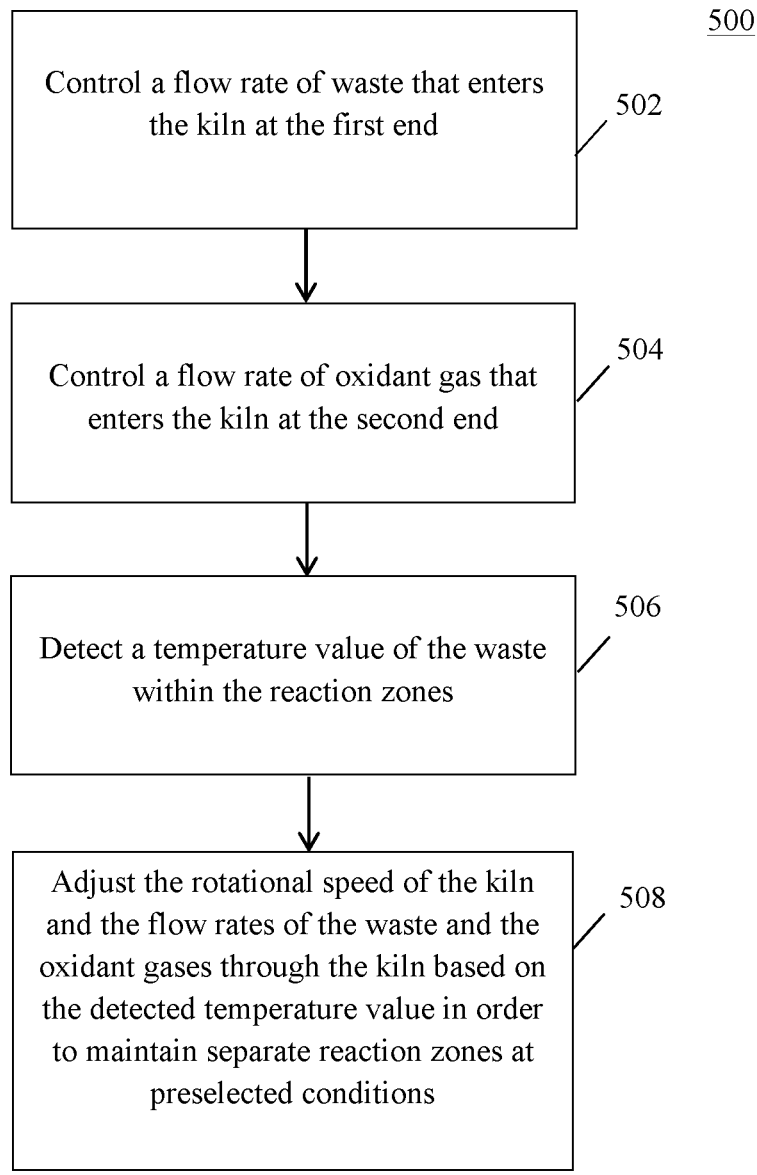
FIG. 5 illustrates a flowchart of an example method according to one example of the disclosure.

FIG. 5 is a flowchart of an example method 500 according to the present disclosure for controlling reactions occurring within a waste gasification kiln that is part of waste re-use processes in order to produce one or more useful products such as power, steam, heat or hot water, or chemicals. The method 500 may be implemented using the above described systems. In operation 502, a flow rate of waste that enters the kiln at the first end may be controlled. In operation 504, a flow rate of oxidant gases that enter the kiln at the second end may be controlled, the second end being opposite to the first end. In operation 506, a temperature value of the waste is detected within the separate reaction zones. In operation 508, the rotational speed of the kiln and the flow rates of the waste and the oxidant gases through the body of the kiln are adjusted based on the detected temperature value in order to maintain the separate reaction zones at preselected conditions.

The technology described herein operates auto-thermally on high moisture fuels. In other words, the technology uses only the heating value of the waste fuel and does not require additional fuels in order to convert the waste. According to one example, flue gas is recirculated to system components in order to maintain temperatures within safe operating ranges for the refractory. According to one example, the recirculated flue gas may provide a close approach to complete combustion, while sustaining a reducing gas environment and limiting a total energy content of the partially oxidized fuel gases. According to one example, combustion of the relatively tar free fuel gas may be controlled by recirculating the flue gas. This minimizes formation of "thermal" NOx through limiting the localized flame temperature and oxygen content at the flame front in the excess air combustion stage. According to one example, the recirculated flue gas prevents sintering in a shallow fluid bed gasifier. Furthermore, the recirculated flue gas enables control over sintering of the ash residue in the residue gasifier.

Currently in the U.S.A., 40 CFR 60 Subpart AAAA provides air emissions standards for MSW combustion systems. These guidelines place limits on the concentrations of regulated stack emissions as well as total annual emissions of criteria pollutants. According to the US-EPA AP-42 standards document, NOx emissions for municipal waste combustors are estimated to be 70% to 80% from the nitrogen content of the waste. Fuel NOx has been computed to correspond to be roughly 40% to 50% of the fuel nitrogen content in municipal combustors. Referring to EPA standard AP-42 paragraph 2.1.3.5, which notes that 70%-80% of NOx generation in municipal waste combustors is from fuel nitrogen, the technology described herein enables a 70% to 80% reduction in NOx emissions. Alternatively, power generation capacity may be increased 3.3 to 5 times while maintaining the pre-reduction emissions levels.

Examples are described above with the aid of functional building blocks that illustrate the implementation of specified functions and relationships thereof. The boundaries of these functional building blocks have been arbitrarily defined herein for the convenience of the description. Alternate boundaries can be defined so long as the specified functions and relationships thereof are appropriately performed. While the foregoing illustrates and describes examples of this technology, it is to be understood that the technology is not limited to the constructions disclosed herein. The technology may be embodied in other specific forms without departing from its spirit. Accordingly, the appended claims are not limited by specific examples described herein.

We claim:

1. A kiln having a plurality of reaction zones therein that thermally convert non-radioactive combustible waste to a substantially non-hazardous, non-leachable, sintered particulate carbon-less ash by-product, the kiln comprising:
   first and second ends;
   a body provided between the first and second ends that defines a cavity having a refractory lining that provides resistance to heat conduction, the body having a length-to-diameter ratio and a longitudinal axis oriented substantially horizontal, wherein the length-to-diameter ratio and the resistance to heat conduction provide a temperature gradient within the cavity that forms separate reaction zones during operation;
a first inlet port provided at the first end to receive waste and a first outlet port provided at the second end to expel sintered ash by-product;
a second inlet port provided at the second end to receive oxidant gas and a second outlet port provided at the first end to expel fuel gas;
flow rate controllers provided at the first inlet port and the second inlet port to control a flow rate therethrough;
a thermal sensor that measures a surface temperature value of the waste within the separate reaction zones;
a motor that is mechanically coupled to the body, wherein the motor rotates the body; and
a processor that is electrically coupled to the flow rate controllers, the motor, and the thermal sensor, the processor having instructions executable to:
 receive signals from the thermal sensor indicating the surface temperature value of the waste within the separate reaction zones;
 determine an onset of particulate sintering based on the surface temperature value within the separate reaction zones;
 control the motor, based on the signals received from the thermal sensor, to adjust a rotation rate of the body to maintain the separate reaction zones at preselected conditions; and
 control the corresponding flow rate controllers, based on the signals received from the thermal sensor, to adjust the flow rates therethrough to maintain the separate reaction zones at the preselected conditions.

2. The kiln according to claim 1, wherein the separate reaction zones exhibit distinct physical and chemical processes.

3. The kiln according to claim 1, wherein the processor includes instructions executable to control the corresponding flow rate controllers to adjust the flow rates of the fuel gas, an auxiliary fuel gas, air, or a recycled flue gas into the cavity.

4. The kiln according to claim 1, wherein the longitudinal axis of the body is tilted in a range of 1°-5° relative to a plane defined by the substantially horizontal longitudinal axis.

5. The kiln according to claim 1, wherein the oxidant gas includes a blend of oxidant gases.

6. The kiln according to claim 1, wherein the first and second ends are provided at opposite sides of the body to enable the waste received at the first end to flow in a counter-current direction relative to the oxidant gas received at the second end.

7. The kiln according to claim 1, wherein the thermal sensor is an infrared sensor.

8. The kiln according to claim 1, wherein the length-to-diameter ratio measured at an interior of the cavity is greater than 4:1.

9. The kiln according to claim 1, wherein the processor includes instructions that are executed to generate a surface temperature profile of the waste based on the surface temperature values.

10. The kiln according to claim 1, wherein the processor includes instructions that are executed to cause the corresponding flow rate controllers to adjust a rate the received waste is deposited into the kiln.

11. The kiln according to claim 1, wherein the processor includes instructions that are executed to cause the corresponding flow rate controllers to adjust an amount of received waste deposited into the kiln.

12. The kiln according to claim 1, wherein the processor includes instructions that are executed to cause the corresponding flow rate controllers to adjust a rate of oxidant deposited into the kiln.

13. The kiln according to claim 1, wherein the processor includes instructions that are executed to cause the corresponding flow rate controllers to adjust a volume of oxidant deposited into the kiln.

14. The kiln according to claim 1, wherein the processor includes instructions that are executed to cause the corresponding flow rate controllers to adjust a composition of oxidant deposited into the kiln.

* * * * *